United States Patent
Chen

(10) Patent No.: US 11,415,848 B2
(45) Date of Patent: Aug. 16, 2022

(54) DISPLAY PANEL

(71) Applicant: TCL CHINA STAR OPTOELECTRONICS TECHNOLOGY CO., LTD., Guangdong (CN)

(72) Inventor: Xingwu Chen, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 278 days.

(21) Appl. No.: 16/956,656

(22) PCT Filed: Apr. 9, 2020

(86) PCT No.: PCT/CN2020/083853
§ 371 (c)(1),
(2) Date: Jun. 22, 2020

(87) PCT Pub. No.: WO2021/184458
PCT Pub. Date: Sep. 23, 2021

(65) Prior Publication Data
US 2021/0286222 A1  Sep. 16, 2021

(30) Foreign Application Priority Data
Mar. 16, 2020 (CN) .......................... 20201018069.9

(51) Int. Cl.
*G02F 1/1362* (2006.01)
*G02F 1/1337* (2006.01)
*G02F 1/1339* (2006.01)
*G02F 1/137* (2006.01)

(52) U.S. Cl.
CPC ...... *G02F 1/136209* (2013.01); *G02F 1/1337* (2013.01); *G02F 1/1339* (2013.01); *G02F 1/13718* (2013.01); *G02F 1/136222* (2021.01)

(58) Field of Classification Search
None
See application file for complete search history.

(56) References Cited

U.S. PATENT DOCUMENTS

| 2007/0026165 A1 | 2/2007 | Okabe |
| 2014/0327867 A1 | 11/2014 | Song et al. |
| 2018/0045998 A1 | 2/2018 | Ye |
| 2019/0258119 A1 | 8/2019 | Park |

FOREIGN PATENT DOCUMENTS

| CN | 101097307 A | 1/2008 |
| CN | 102955300 A | 3/2013 |
| CN | 103488005 A | 1/2014 |
| CN | 104849922 A | 8/2015 |
| CN | 109239969 A | 1/2019 |

(Continued)

*Primary Examiner* — Richard H Kim
(74) *Attorney, Agent, or Firm* — Mark M. Friedman

(57) ABSTRACT

A display panel is provided. The display panel includes pixel electrodes, and black matrices located between adjacent pixel electrodes. Opaque regions are formed between the pixel electrodes. Dark strip regions are formed at part of edges of pixel electrodes. The black matrices cover the opaque regions and the dark strip regions. The provided display panel increases an area of a display region by oppositely disposing the black matrices and the pixel electrodes.

20 Claims, 14 Drawing Sheets

(56) References Cited

FOREIGN PATENT DOCUMENTS

| | | |
|---|---|---|
| CN | 208999730 U | 6/2019 |
| CN | 110531548 A | 12/2019 |
| CN | 110703516 A | 1/2020 |
| CN | 110794625 A | 2/2020 |
| CN | 110824789 A | 2/2020 |

DISPLAY PANEL

FIELD OF INVENTION

The present disclosure relates to the field of display technology, particularly relates to the field of liquid crystal display technology, and specifically relates to a display panel.

BACKGROUND OF INVENTION

In application of polymer stabilized vertical alignment (PSVA) liquid crystal display technology, chiral auxiliary reagents are added into liquid crystal layers of display panels, and then a PSVA process is performed on liquid crystal cells to form pretilt angles for deflecting liquid crystals. Because an electric field on peripheral regions of pixel electrodes is weak, rotations with different angles occur to liquid crystals located on the peripheral regions of the pixel electrodes and some dark strips are formed, reducing a penetration rate of the display panels.

SUMMARY OF INVENTION

The present disclosure provides a display panel to solve a problem of a low penetration rate incurred by PSVA liquid crystal display technology.

The present disclosure provides a display panel, including an array substrate and a color film substrate aligned opposite to each other, and a liquid crystal layer disposed between the array substrate and the color film substrate. The liquid crystal layer includes a plurality of liquid crystal molecules and a chiral auxiliary reagent which are mixed. The display panel further includes a plurality of pixel electrodes, and a plurality of black matrices located between adjacent pixel electrodes. A plurality of opaque regions are formed between the plurality of pixel electrodes. A plurality of dark strip regions are formed at part of edges of the plurality of pixel electrodes due to the chiral auxiliary reagent causing different rotational directions of the plurality of liquid crystal molecules. The plurality of black matrices cover the plurality of opaque regions and the plurality of dark strip regions.

On the basis of the first aspect, in a first embodiment of the first aspect, the plurality of pixel electrodes include a cross-shaped main electrode, an obliquely-disposed branch electrode, and a sealing electrode. A trunk of the cross-shaped main electrode is connected to one end of the obliquely-disposed branch electrode, and the sealing electrode and another end of the obliquely-disposed branch electrode are connected to an end of the cross-shaped main electrode.

On the basis of the first aspect, in a second embodiment of the first aspect, a screw pitch of the plurality of liquid crystal molecules ranges two to seven times of a thickness of the cell gap.

On the basis of the first aspect, in a third embodiment of the first aspect, a first alignment layer is disposed on the array substrate, a second alignment layer is disposed on the color film substrate, and the first alignment layer and the second alignment layer are disposed correspondingly.

On the basis of the first aspect, in a fourth embodiment of the first aspect, the plurality of pixel electrodes are disposed on the array substrate, and a color filter layer and a common electrode layer are sequentially disposed on the color film substrate.

On the basis of the first aspect, in a fifth embodiment of the first aspect, a photo spacer is formed on a side of the color film substrate facing the array substrate, and a height of the photo spacer is less than or equal to a thickness of the liquid crystal layer.

On a second aspect, the present disclosure provides another display panel, including an array substrate and a color film substrate aligned opposite to each other, and a liquid crystal layer disposed between the array substrate and the color film substrate. The liquid crystal layer includes a plurality of liquid crystal molecules and a chiral auxiliary reagent which are mixed. The display panel further includes a plurality of pixel electrodes, and a plurality of black matrices located between adjacent pixel electrodes. A plurality of opaque regions are formed between the plurality of pixel electrodes. A plurality of dark strip regions are formed at part of edges of the plurality of pixel electrodes due to the chiral auxiliary reagent causing different rotation directions of the plurality of liquid crystal molecules. Wherein the plurality of pixel electrodes are configured to be patterns with symmetrical structures, and when the chiral auxiliary reagent is configured to be a dextral chiral auxiliary reagent, the plurality of black matrices cover the plurality of opaque regions and the plurality of dark strip regions in a staggered manner.

On the basis of the second aspect, in a first embodiment of the second aspect, when four adjacent pixel electrodes are arranged in a rectangular shape, the plurality of black matrices include a first vertical black matrix, a second vertical black matrix, a third vertical black matrix, and a fourth vertical black matrix which are connected to each other sequentially from top to bottom, and a first horizontal black matrix, a second horizontal black matrix, a third horizontal black matrix, and a fourth horizontal black matrix which are connected to each other sequentially from left to right. Comparing to a vertical center line, the first vertical black matrix shifts to left, the second vertical black matrix shifts to right, the third vertical black matrix shifts to left, and the fourth vertical black matrix shifts to right. Comparing to a horizontal center line, the first horizontal black matrix shifts to bottom, the second horizontal black matrix shifts to top, the third horizontal black matrix shifts to bottom, and the fourth horizontal black matrix shifts to top.

On the basis of the second aspect, in a first embodiment of the second aspect, when four adjacent pixel electrodes are arranged in a rectangular shape, the plurality of black matrices comprise a first vertical black matrix, a second vertical black matrix, a third vertical black matrix, and a fourth vertical black matrix which are connected to each other sequentially from top to bottom, and a first horizontal black matrix, a second horizontal black matrix, a third horizontal black matrix, and a fourth horizontal black matrix which are connected to each other sequentially from left to right. Comparing to a vertical center line, the first vertical black matrix shifts to right, the second vertical black matrix shifts to left, the third vertical black matrix shifts to right, and the fourth vertical black matrix shifts to left. Comparing to a horizontal center line, the first horizontal black matrix shifts to top, the second horizontal black matrix shifts to bottom, the third horizontal black matrix shifts to top, and the fourth horizontal black matrix shifts to bottom.

On a third aspect, the present disclosure provides another display panel, including an array substrate and a color film substrate aligned opposite to each other, and a liquid crystal layer disposed between the array substrate and the color film substrate. The liquid crystal layer includes a plurality of liquid crystal molecules and a chiral auxiliary reagent which are mixed. The display panel further includes a plurality of pixel electrodes, and a plurality of black matrices located between adjacent pixel electrodes.

A plurality of opaque regions are formed between the plurality of pixel electrodes.

A plurality of dark strip regions are formed at part of edges of the plurality of pixel electrodes due to the chiral auxiliary reagent causing different rotational directions of the plurality of liquid crystal molecules.

Wherein the plurality of pixel electrodes are configured to be patterns with dissymmetrical structures, and when the chiral auxiliary reagent is configured to be a levo chiral auxiliary reagent, a branch electrode and a sealing electrode disposed in the plurality of dark strip regions are widened pixel electrodes, and the plurality of black matrices symmetrically cover the plurality of opaque regions and the plurality of dark strip regions.

The display panel provided by the present disclosure allows the black matrices to cover the opaque regions and the dark strip regions by oppositely disposing the black matrices and the pixel electrodes, increasing an area of the display regions and effectively improving a penetration rate of PSVA-type liquid crystal displays.

DETAILED DESCRIPTION OF PREFERRED EMBODIMENTS

For making the purposes, technical solutions and effects of the present disclosure be clearer and more definite, the present disclosure will be further described in detail below. It should be understood that the specific embodiments described herein are merely for explaining the present disclosure and are not intended to limit the present disclosure.

A display panel provided by this embodiment is able but is not limited to be used in polymer stabilized vertical alignment (PSVA) display technology, and it can also be used in the field of display technology, particularly, liquid crystal display technology.

Figure 1A:
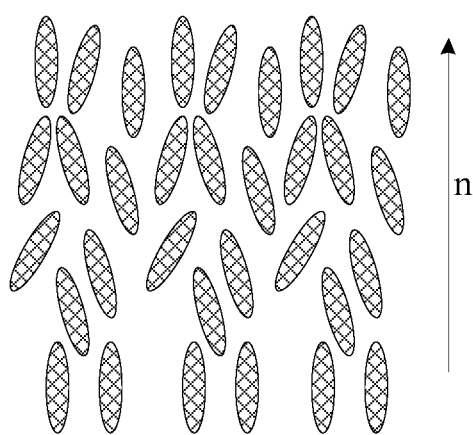
FIG. 1A is a nematic phase schematic diagram of PSVA-type liquid crystals provided by an embodiment of the present disclosure.
Figure 1B:
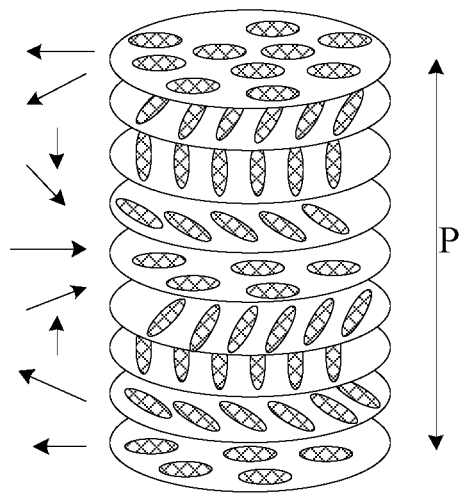
FIG. 1B is a cholesteric phase schematic diagram of the PSVA-type liquid crystals (containing a chiral auxiliary reagent) provided by an embodiment of the present disclosure.
Figure 1C:
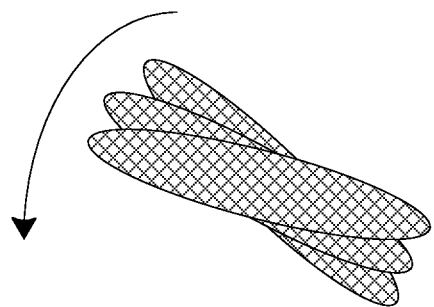
FIG. 1C is a rotational schematic diagram of dextral liquid crystals provided by an embodiment of the present disclosure.
Figure 1D:
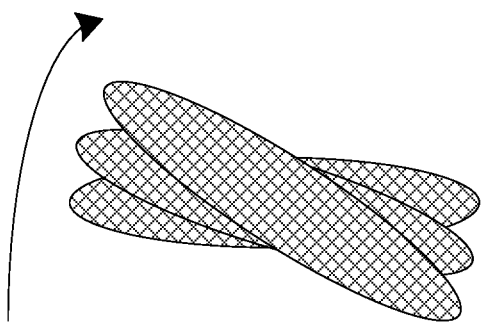
FIG. 1D is a rotational schematic diagram of levo liquid crystals provided by an embodiment of the present disclosure.

In order to better understand invention processes of the present disclosure, FIG. 1A, FIG. 1B, FIG. 1C, and FIG. 1D are combined to describe influence of chiral auxiliary reagents on liquid crystal rotational directions. Illustrated in FIG. 1A is an arrangement of nematic liquid crystals in PSVA display technology, and refractive indexes of different liquid crystals change according to different wave lengths. Illustrated in FIG. 1B is a cholesteric phase including a chiral auxiliary reagent, wherein pitch (P) in FIG. 1B is a screw pitch, and liquid crystals with different wavelengths change with different voltages applied on them. Different chiral monomers are added into the liquid crystals in FIG. 1A and FIG. 1B, wherein the chiral monomers can include a levo chiral auxiliary reagent and a dextral chiral auxiliary reagent. According to different light-induced rotational directions from chiral molecules, the one rotating clockwise is the levo chiral auxiliary reagent, and the one rotating counterclockwise is the dextral chiral auxiliary reagent. Therefore, after the liquid crystals are applied the voltage, the dextral liquid crystals in FIG. 1C and the levo liquid crystals in FIG. 1D are respectively formed.

Figure 2A:
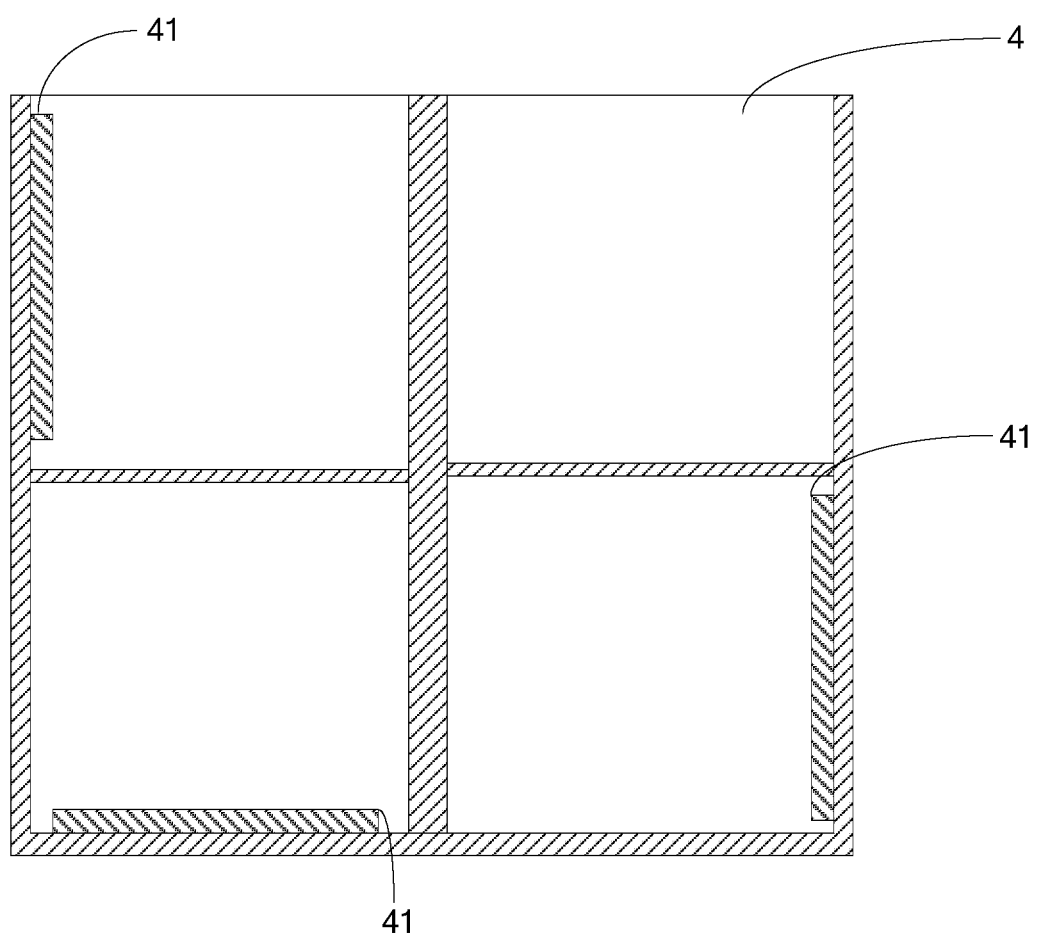
FIG. 2A is a schematic diagram of generated positions of dark strip regions in pixel electrodes due to the levo liquid crystals provided by an embodiment of the present disclosure.
Figure 2B:
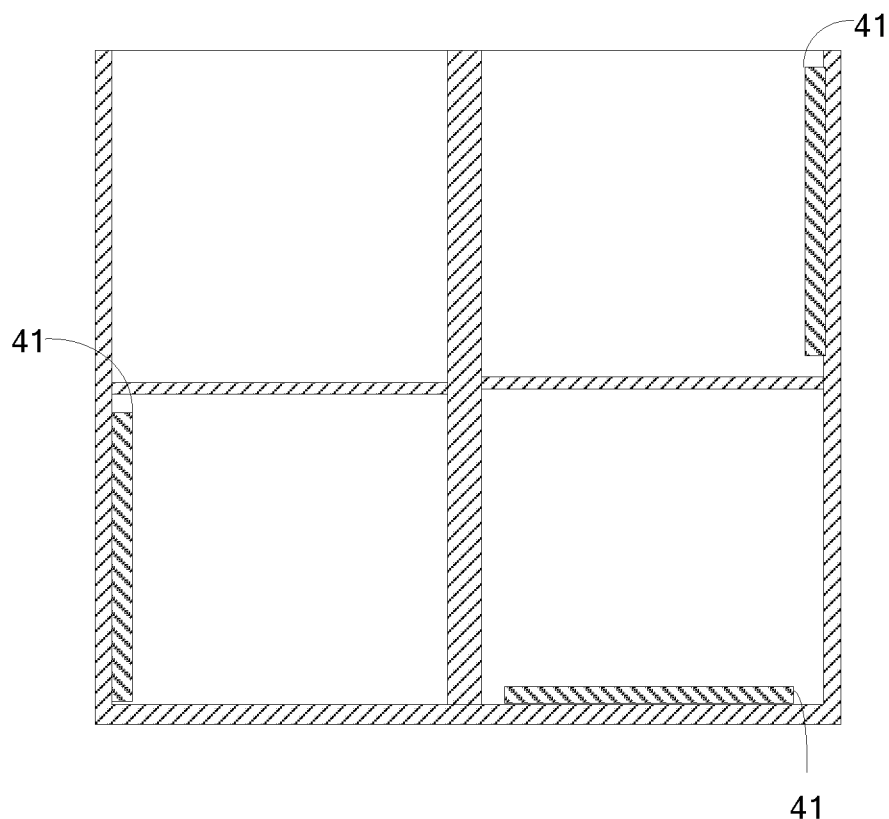
FIG. 2B is a schematic diagram of generated positions of dark strip regions in the pixel electrodes due to the dextral liquid crystals provided by an embodiment of the present disclosure.

Correspondingly, as illustrated in FIG. 2A, the dextral liquid crystals in FIG. 1C form dark strip regions on relatively fixed positions of the pixel electrodes, and as illustrated in FIG. 2B, the levo liquid crystals in FIG. 1D form dark strip regions on relatively fixed positions of the pixel electrodes.

Based on this, the present disclosure adjusts widths of the black matrices in different regions, or adjusts related electrode wiring widths of the pixel electrodes to change generated positions of dark strip regions in the pixel electrodes by correspondingly disposing the black matrices and the pixel electrodes, so that the black matrices matches the black matrices, and effect of increasing an area of the display regions and improving effect of the penetration rate. The implement processes of the present disclosure are further described as follow by combining specific embodiments.

Figure 3:
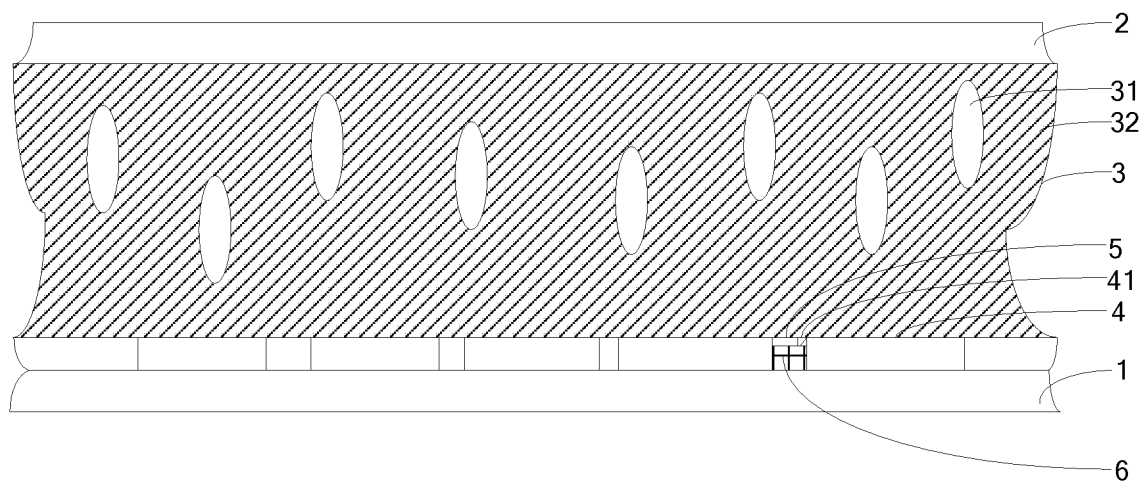
FIG. 3 is a structural schematic diagram of a display panel provided by an embodiment of the present disclosure.

As illustrated in FIG. 3, this embodiment provides a display panel, including an array substrate 1 and a color film substrate 2 aligned opposite to each other, and a liquid crystal layer 3 disposed between the array substrate 1 and the color film substrate 2. The liquid crystal layer 3 includes liquid crystal molecules 31 and a chiral auxiliary reagent 32 which are mixed. The display panel further includes a plurality of pixel electrodes 4, and a plurality of black matrices 6 located between adjacent pixel electrodes 4. Opaque regions 5 are formed between the pixel electrodes 4. Dark strip regions 41 are formed at part of edges of the pixel electrodes 4 due to the chiral auxiliary reagent 32 causing different rotational directions of liquid crystal molecules 31. The black matrices 6 cover the opaque regions 5 and the dark strip regions 41.

Specifically, correspondingly disposing the black matrices 6 and the pixel electrodes 4 of this embodiment includes but is not limited to adjusting the widths of the black matrices 6, or adjusting the widths of pixel wiring 42 of the pixel electrodes 4 to increase the area of the display regions, thereby improving the penetration rate. Furthermore, the opaque regions 5 and the dark strip regions 41 can be but are not limited to an abutting relation. Furthermore, the black matrices 6 can be disposed on the array substrate 1 or the color film substrate 2.

Injecting liquid crystal molecules 31 in to the liquid crystal layer 3. An injection method of the liquid crystal molecules 31 can be a inkjet printing (IJP) method or other methods. The liquid crystal molecules 31 are negative liquid crystals, and meanwhile, the chiral auxiliary reagent 32 is added into the liquid crystal molecules 31. The chiral auxiliary reagent 32 can be the levo chiral auxiliary reagent and the dextral chiral auxiliary reagent. Afterwards, a bonding process can be performed to form a liquid crystal cell, and the PSVA process is performed on the liquid crystal cell, that is, powering up to irradiate ultraviolet (UV) light, forming pretilt angles, thereby forming the liquid crystal display device.

In an embodiment, the liquid crystal molecules 31 are negative liquid crystals, and an optical path difference of the plurality of liquid crystal molecules ranges from 300 nm to 500 nm.

Specifically, materials and a range of the optical path difference of the liquid crystal molecules 31 are limited, which is conducive to improving the penetration rate of the display panel.

In an embodiment, a cell gap of the display panel ranges from 2.5 μm to 3.5 μm.

Specifically, the cell gap of the display panel in this embodiment is limited, which is conducive to improving the penetration rate of the display panel.

In an embodiment, a screw pitch of the liquid crystal molecules 31 ranges from two to seven times of a thickness of the cell gap.

Specifically, the screw pitch of the liquid crystal molecules 31 and the cell gap of the display panel are limited in this embodiment, which is conducive to improving the penetration rate of the display panel.

Figure 4A:
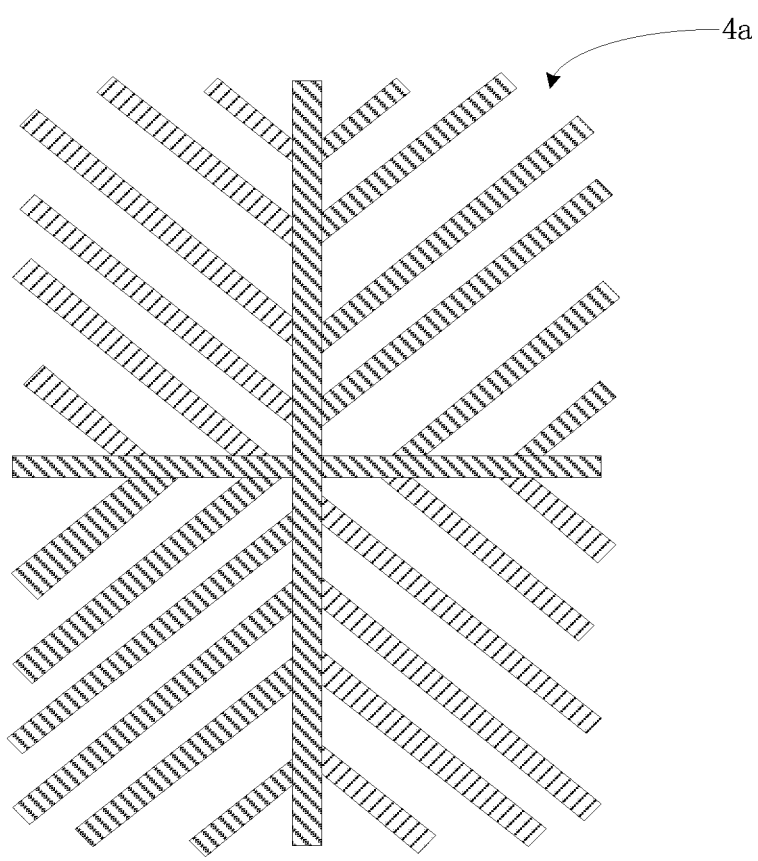
FIG. 4A is a structural schematic diagram of symmetric structural type pixel electrodes provided by an embodiment of the present disclosure.
Figure 4B:
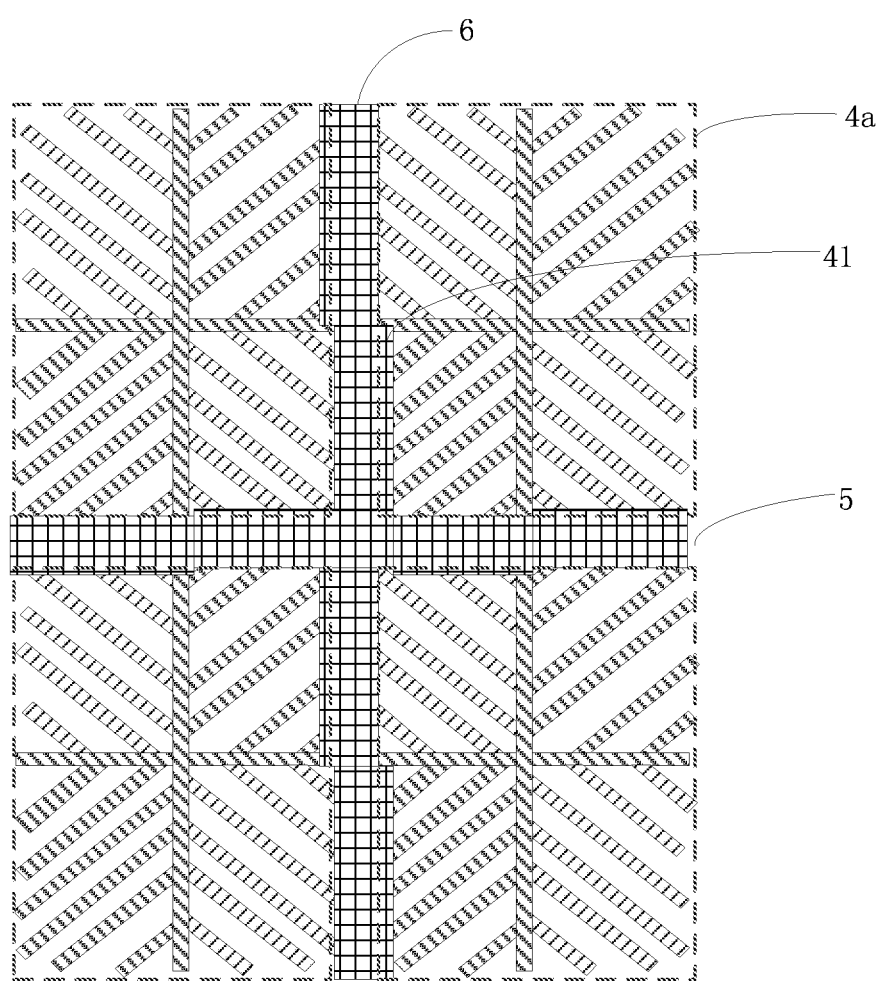
FIG. 4B is a first structural schematic diagram of the pixel electrodes and black matrices illustrated in FIG. 4A.
Figure 4C:
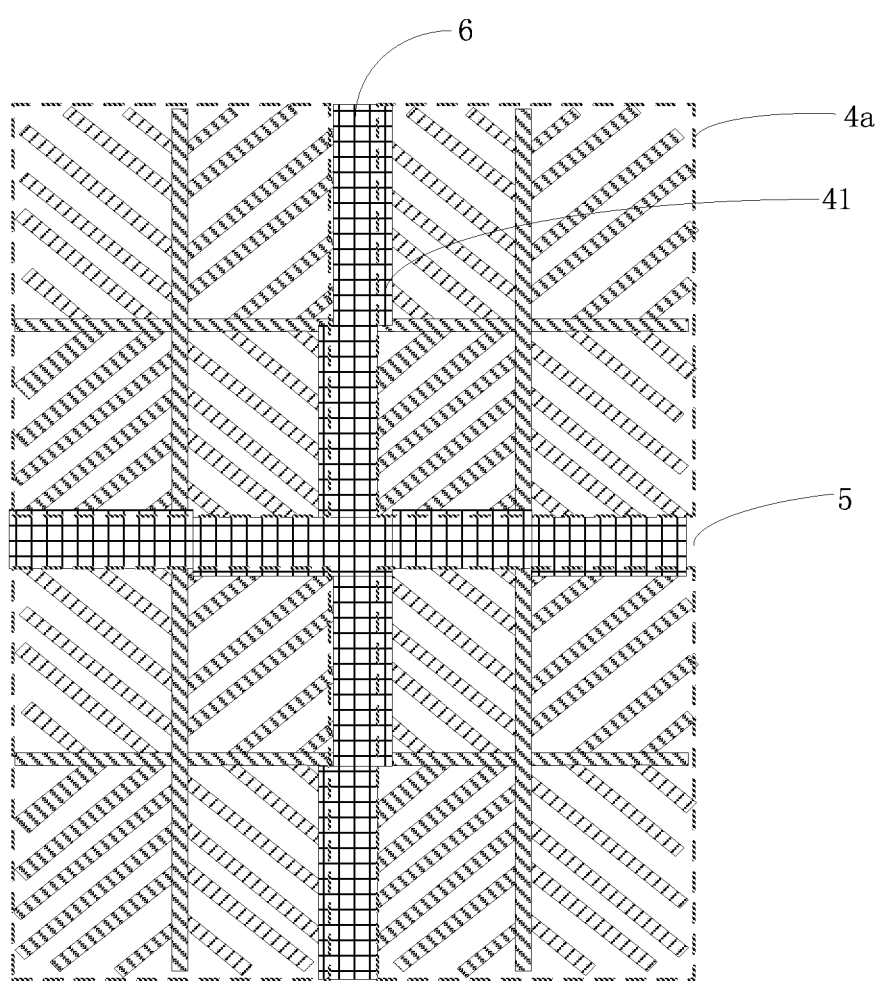
FIG. 4C is a second structural schematic diagram of the pixel electrodes and the black matrices illustrated in FIG. 4A.

In an embodiment, as illustrated in FIG. 4A, the pixel electrodes 4 are configured as a symmetric structural pattern 4a. As illustrated in FIG. 4B and FIG. 4C, the black matrices 6 cover the opaque regions 5 and the dark strip regions 41 in a staggered manner.

As illustrated in FIG. 4B, it should be noted that when four adjacent pixel electrodes 4 are arranged in a rectangular shape, the black matrices can include a first vertical black matrix, a second vertical black matrix, a third vertical black matrix, and a fourth vertical black matrix which are connected to each other sequentially from top to bottom, and a first horizontal black matrix, a second horizontal black matrix, a third horizontal black matrix, and a fourth horizontal black matrix which are connected to each other sequentially from left to right. Comparing to a vertical center line, the first vertical black matrix shifts to left, the second vertical black matrix shifts to right, the third vertical black matrix shifts to left, and the fourth vertical black matrix shifts to right. Comparing to a horizontal center line, the first horizontal black matrix shifts to bottom, the second horizontal black matrix shifts to top, the third horizontal black matrix shifts to bottom, and the fourth horizontal black matrix shifts to top.

As illustrated in FIG. 4C, when four adjacent pixel electrodes are arranged in a rectangular shape, the black matrices include a first vertical black matrix, a second vertical black matrix, a third vertical black matrix, and a fourth vertical black matrix which are connected to each other sequentially from top to bottom, and a first horizontal black matrix, a second horizontal black matrix, a third horizontal black matrix, and a fourth horizontal black matrix which are connected to each other sequentially from left to right. Comparing to a vertical center line, the first vertical black matrix shifts to right, the second vertical black matrix shifts to left, the third vertical black matrix shifts to right, and the fourth vertical black matrix shifts to left. Comparing to a horizontal center line, the first horizontal black matrix shifts to top, the second horizontal black matrix shifts to bottom, the third horizontal black matrix shifts to top, and the fourth horizontal black matrix shifts to bottom.

Specifically, generated positions of the dark strip regions 41 are relatively fixed in the pixel electrodes 4. Regarding the pixel electrodes 4 with symmetrical structures, by increasing the widths of the black matrices, the black matrices 6 can be made to only cover the corresponding dark strip regions 41, and meanwhile, the widths of the display region of the black matrices 6 in the pixel electrodes 4 are reduced. By the adjustment, the black matrices 6 are not horizontal, vertical, and uniform in widths as normal, but have different widths, and cover the opaque regions 5 and the dark strip regions 41 in a staggered manner. Therefore, the dark strip regions 41 are occluded, and meanwhile, the area of the display region is enlarged, thereby improving the penetration rate. Furthermore, FIG. 4B is a structural schematic diagram of the symmetrical pixel electrodes 4 and the black matrices 6 corresponding to the levo liquid crystals 31, and FIG. 4C is a structural schematic diagram of the symmetrical pixel electrodes 4 and the black matrices 6 corresponding to the dextral liquid crystals 31.

Figure 5A:
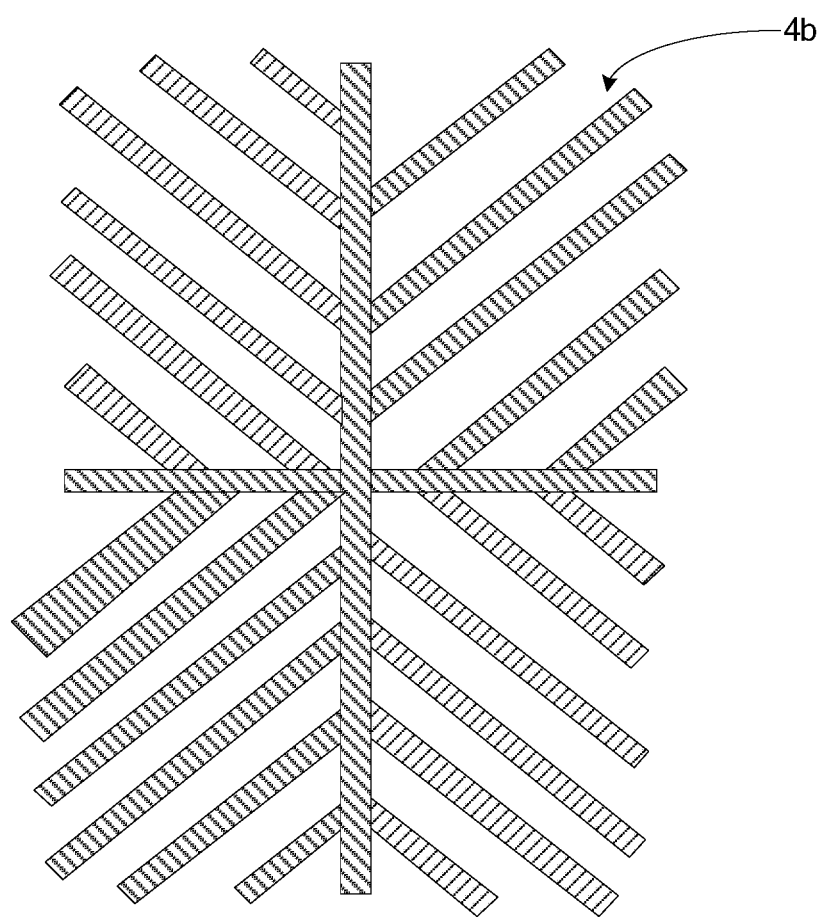
FIG. 5A is a structural schematic diagram of dissymmetric structural type pixel electrodes provided by an embodiment of the present disclosure.
Figure 5B:
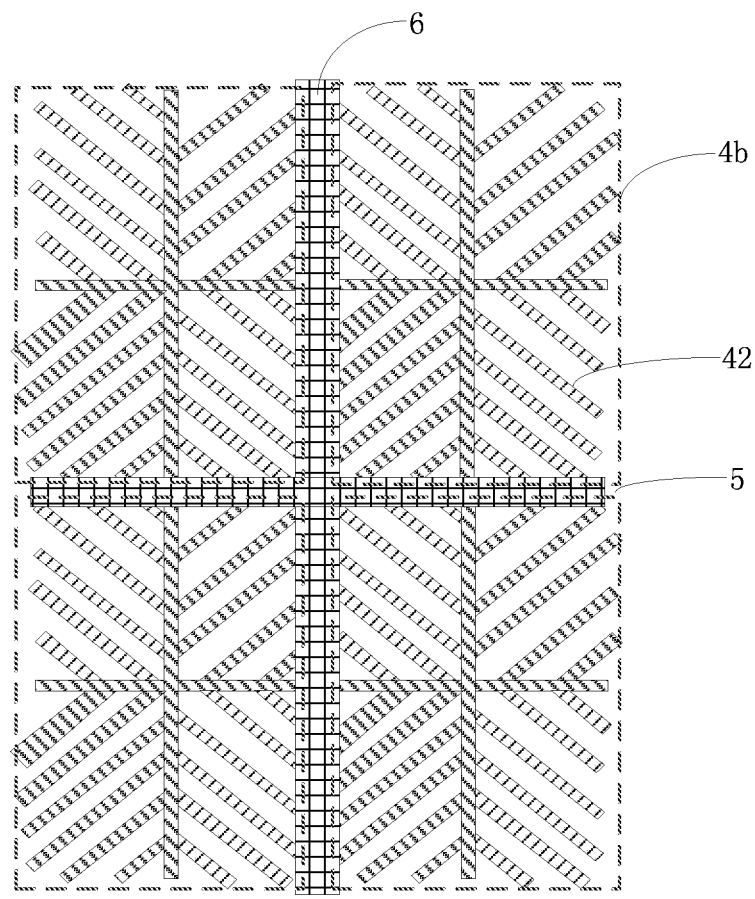
FIG. 5B is a structural schematic diagram of the pixel electrodes and the black matrices illustrated in FIG. 5A.
Figure 6A:
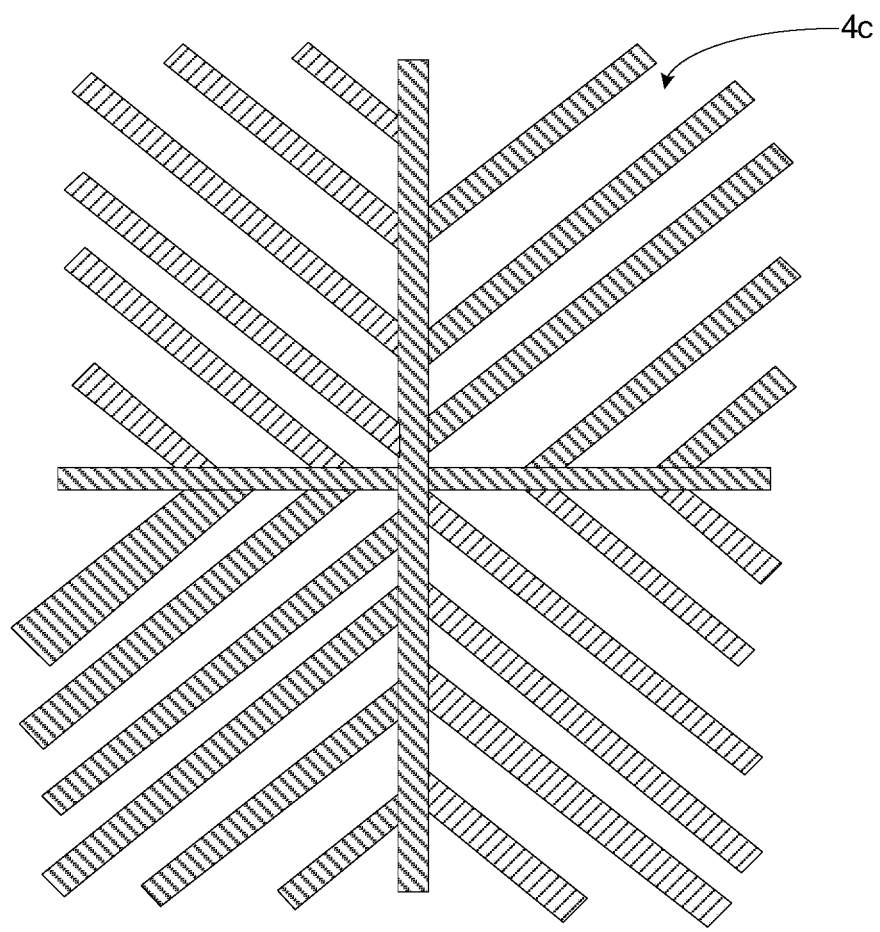
FIG. 6A is another structural schematic diagram of dissymmetric structural type pixel electrodes provided by an embodiment of the present disclosure.
Figure 6B:
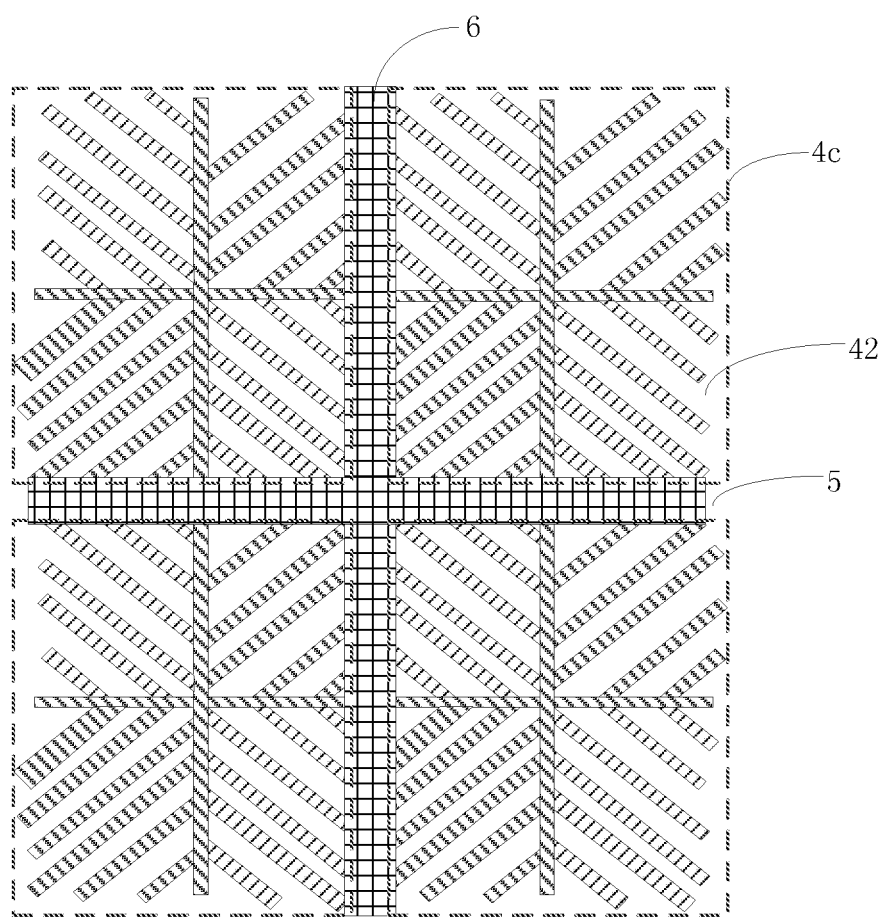
FIG. 6B is another structural schematic diagram of the pixel electrodes and the black matrices illustrated in FIG. 6A.

In an embodiment, as illustrated in FIG. 5A and FIG. 6A, the pixel electrodes 4 are configured as a dissymmetric structural pattern 4b or 4c. Sequentially corresponding embodiments are as illustrated in FIG. 5B and FIG. 6B. The pixel electrodes 4 include a plurality of electrically connected pixel electrode wirings 42. The pixel electrode wirings 42 located in the dark strip regions 41 are configured as widened pixel electrode wirings 42, and the black matrices 6 symmetrically cover the opaque regions 5 and the dark strip regions 41.

Specifically, in this embodiment, the voltage applied on the liquid crystal molecules 31 located in the dark strip regions 41 are made more even by increasing widths of pixel electrode wirings 42 located in the dark strip regions 41, thereby reducing the dark strip regions 41. Furthermore, the dark strip regions 41 can be adjusted to more marginal positions on the pixel electrodes 4, which is able to reduce widths of the black matrices 6 and increases an area of the display region, improving the penetration rate. Furthermore, FIG. 5B is a structural schematic diagram of the dissymmetrical pixel electrodes 4 and the black matrices 6 corresponding to the levo liquid crystals 31, and FIG. 6B is a structural schematic diagram of the dissymmetrical pixel electrodes 4 and the black matrices 6 corresponding to the dextral liquid crystals 31.

Figure 7A:
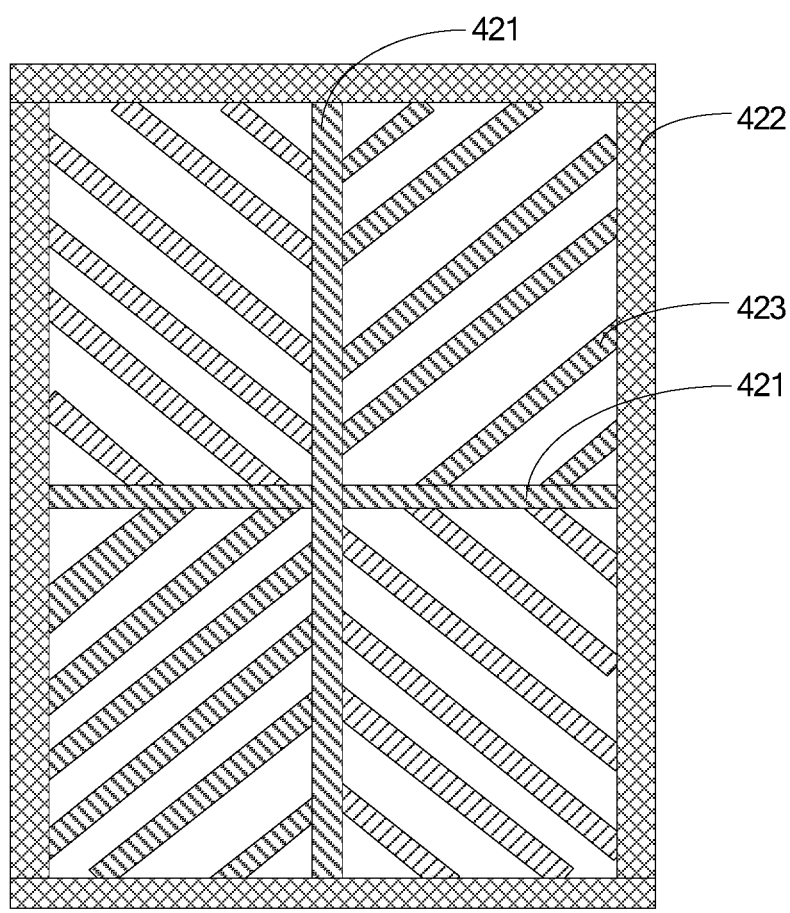
FIG. 7A is a first structural schematic diagram of using sealing design on the pixel electrodes provided by an embodiment of the present disclosure.
Figure 7B:
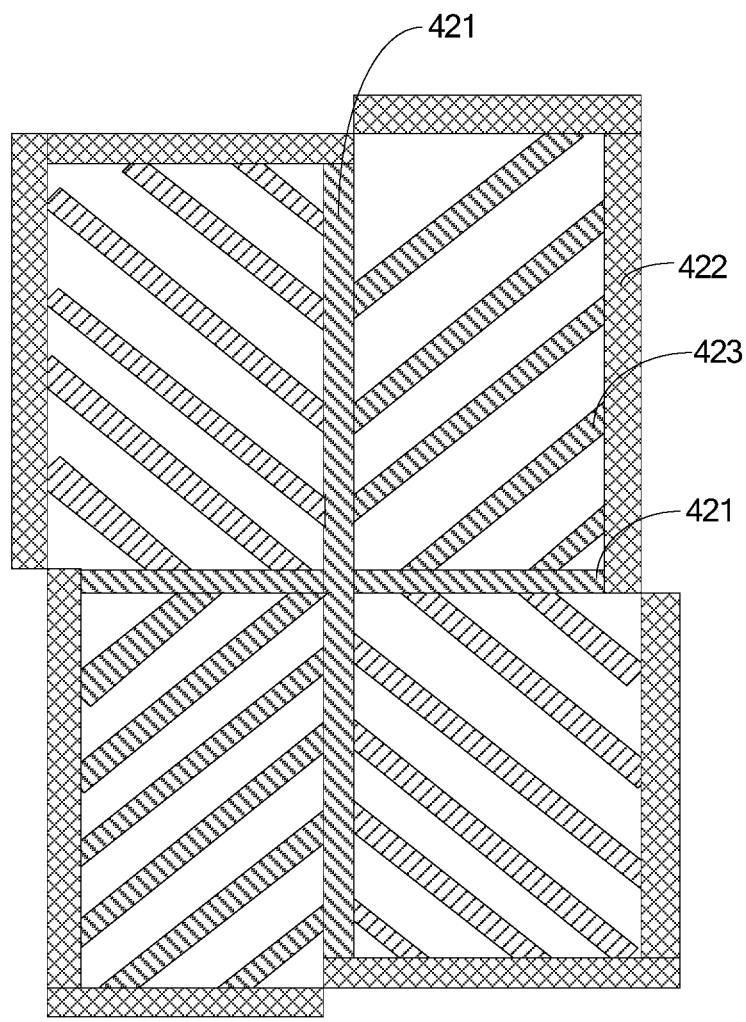
FIG. 7B is a second structural schematic diagram of using sealing design on the pixel electrodes provided by an embodiment of the present disclosure.
Figure 7C:
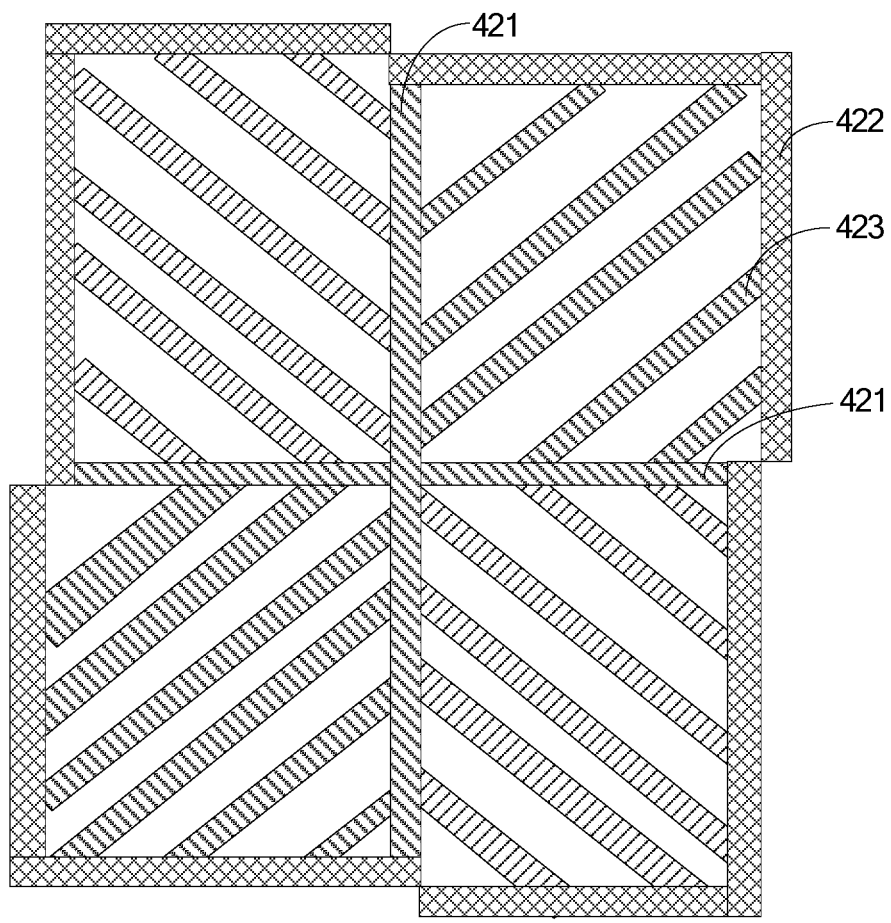
FIG. 7C is a third structural schematic diagram of using sealing design on the pixel electrodes provided by an embodiment of the present disclosure.

As illustrated in FIG. 7A, FIG. 7B, or FIG. 7C, in an embodiment, the plurality of pixel electrodes 4 include a cross-shaped main electrode 421, an obliquely-disposed branch electrode 423, and a sealing electrode 422. A trunk of the cross-shaped main electrode 421 is connected to one end of the obliquely-disposed branch electrode 423, and the sealing electrode 422 and another end of the obliquely-disposed branch electrode 423 are connected to an end of the cross-shaped main electrode 421.

Specifically, in this embodiment, using the sealing design on the pixel electrodes 4 makes alignment of the liquid crystal molecules 31 be more even, and can effectively reduce dark strip regions 41 to improve the penetration rate.

As illustrated in FIG. 3, in an embodiment, a first alignment layer (not shown) is disposed on the array substrate 1, a second alignment layer (not shown) is disposed on the color film substrate 2, and the first alignment layer and the second alignment layer are disposed correspondingly.

Specifically, in this embodiment, the alignment layers provided to the liquid crystal layer 3 makes alignment of the liquid crystal molecules 31 be more even, and can effectively reduce the generated dark strip regions 41 to improve the penetration rate.

As illustrated in FIG. 3, in an embodiment, the plurality of pixel electrodes 4 are disposed on the array substrate 1, and a color filter layer (not shown) and a common electrode layer (not shown) are sequentially disposed on the color film substrate 2.

As illustrated in FIG. 3, in an embodiment, a photo spacer (not shown) is formed on a side of the color film substrate 2 facing the array substrate 1, and a height of the photo spacer is less than or equal to a thickness of the liquid crystal layer 3.

In an embodiment, this embodiment provides a liquid crystal display device. The liquid crystal display device can include at least one display panel of the embodiments mentioned above, or a display panel of a plurality of combined embodiments, which also has effect of improving a penetration rate of the liquid crystal display device.

It can be understood, that for those of ordinary skill in the art, various other corresponding changes and modifications can be made according to the technical solutions and technical ideas of the present disclosure, and all such changes and modifications are intended to fall within the scope of protection of the claims of the present disclosure.

What is claimed is:

1. A display panel, comprising an array substrate and a color film substrate aligned opposite to each other, and a liquid crystal layer disposed between the array substrate and the color film substrate, wherein the liquid crystal layer comprises a plurality of liquid crystal molecules and a chiral auxiliary reagent which are mixed, and the display panel comprises a plurality of pixel electrodes, and a plurality of black matrices located between adjacent pixel electrodes, wherein a plurality of opaque regions are formed between the plurality of pixel electrodes, a plurality of dark strip regions are formed at part of edges of the plurality of pixel electrodes due to the chiral auxiliary reagent causing different rotational directions of the plurality of liquid crystal molecules, and the plurality of black matrices cover the plurality of opaque regions and the plurality of dark strip regions.

2. The display panel as claimed in claim 1, wherein the plurality of pixel electrodes comprise a cross-shaped main electrode, an obliquely-disposed branch electrode, and a sealing electrode, a trunk of the cross-shaped main electrode is connected to one end of the obliquely-disposed branch electrode, and the sealing electrode and another end of the obliquely-disposed branch electrode are connected to an end of the cross-shaped main electrode.

3. The display panel as claimed in claim 1, wherein the plurality of liquid crystal molecules are negative liquid crystals, and an optical path difference of the plurality of liquid crystal molecules ranges from 300 nm to 500 nm.

4. The display panel as claimed in claim 1, wherein a cell gap of the display panel ranges from 2.5 µm to 3.5 µm.

5. The display panel as claimed in claim 4, wherein a screw pitch of the plurality of liquid crystal molecules ranges from two to seven times of a thickness of the cell gap.

6. The display panel as claimed in claim 1, wherein a first alignment layer is disposed on the array substrate, a second alignment layer is disposed on the color film substrate, and the first alignment layer and the second alignment layer are disposed correspondingly.

7. The display panel as claimed in claim 1, wherein the plurality of pixel electrodes are disposed on the array substrate, and a color filter layer and a common electrode layer are sequentially disposed on the color film substrate.

8. The display panel as claimed in claim 1, wherein a photo spacer is formed on a side of the color film substrate facing the array substrate, and a height of the photo spacer is less than or equal to a thickness of the liquid crystal layer.

9. A display panel, comprising an array substrate and a color film substrate aligned opposite to each other, and a liquid crystal layer disposed between the array substrate and the color film substrate, wherein the liquid crystal layer comprises a plurality of liquid crystal molecules and a chiral auxiliary reagent which are mixed, and the display panel comprises a plurality of pixel electrodes, and a plurality of black matrices located between adjacent pixel electrodes,
wherein a plurality of opaque regions are formed between the plurality of pixel electrodes,
a plurality of dark strip regions are formed at part of edges of the plurality of pixel electrodes due to the chiral auxiliary reagent causing different rotational directions of the plurality of liquid crystal molecules, and
wherein the plurality of pixel electrodes are configured to be patterns with symmetrical structures, and when the chiral auxiliary reagent is configured to be a dextral chiral auxiliary reagent, the plurality of black matrices cover the plurality of opaque regions and the plurality of dark strip regions in a staggered manner.

10. The display panel as claimed in claim 9, wherein when four adjacent pixel electrodes are arranged in a rectangular shape, the plurality of black matrices comprise a first vertical black matrix, a second vertical black matrix, a third vertical black matrix, and a fourth vertical black matrix which are connected to each other sequentially from top to bottom, and a first horizontal black matrix, a second horizontal black matrix, a third horizontal black matrix, and a fourth horizontal black matrix which are connected to each other sequentially from left to right,
wherein comparing to a vertical center line, the first vertical black matrix shifts to left, the second vertical black matrix shifts to right, the third vertical black matrix shifts to left, and the fourth vertical black matrix shifts to right, and
comparing to a horizontal center line, the first horizontal black matrix shifts to bottom, the second horizontal black matrix shifts to top, the third horizontal black matrix shifts to bottom, and the fourth horizontal black matrix shifts to top.

11. The display panel as claimed in claim 9, wherein when four adjacent pixel electrodes are arranged in a rectangular shape, the plurality of black matrices comprise a first vertical black matrix, a second vertical black matrix, a third vertical black matrix, and a fourth vertical black matrix which are connected to each other sequentially from top to bottom, and a first horizontal black matrix, a second horizontal black matrix, a third horizontal black matrix, and a fourth horizontal black matrix which are connected to each other sequentially from left to right, wherein comparing to a vertical center line, the first vertical black matrix shifts to right, the second vertical black matrix shifts to left, the third vertical black matrix shifts to right, and the fourth vertical black matrix shifts to left, and comparing to a horizontal center line, the first horizontal black matrix shifts to top, the second horizontal black matrix shifts to bottom, the third horizontal black matrix shifts to top, and the fourth horizontal black matrix shifts to bottom.

12. The display panel as claimed in claim 9, wherein the plurality of liquid crystal molecules are negative liquid crystals, and an optical path difference of the plurality of liquid crystal molecules ranges from 300 nm to 500 nm.

13. The display panel as claimed in claim 9, wherein a cell gap of the display panel ranges from 2.5 μm to 3.5 μm.

14. The display panel as claimed in claim 13, wherein a screw pitch of the plurality of liquid crystal molecules ranges from two to seven times of a thickness of the cell gap.

15. The display panel as claimed in claim 9, wherein a first alignment layer is disposed on the array substrate, a second alignment layer is disposed on the color film substrate, and the first alignment layer and the second alignment layer are disposed correspondingly.

16. The display panel as claimed in claim 9, wherein the plurality of pixel electrodes are disposed on the array substrate, and a color filter layer and a common electrode layer are sequentially disposed on the color film substrate.

17. The display panel as claimed in claim 9, wherein a photo spacer is formed on a side of the color film substrate facing the array substrate, and a height of the photo spacer is less than or equal to a thickness of the liquid crystal layer.

18. A display panel, comprising an array substrate and a color film substrate aligned opposite to each other, and a liquid crystal layer disposed between the array substrate and the color film substrate, wherein the liquid crystal layer comprises a plurality of liquid crystal molecules and a chiral auxiliary reagent which are mixed, and the display panel comprises a plurality of pixel electrodes, and a plurality of black matrices located between adjacent pixel electrodes, wherein a plurality of opaque regions are formed between the plurality of pixel electrodes, a plurality of dark strip regions are formed at part of edges of the plurality of pixel electrodes due to the chiral auxiliary reagent causing different rotational directions of the plurality of liquid crystal molecules, and wherein the plurality of pixel electrodes are configured to be patterns with dissymmetrical structures, and when the chiral auxiliary reagent is configured to be a levo chiral auxiliary reagent, a branch electrode and a sealing electrode disposed in the plurality of dark strip regions are widened pixel electrodes, and the plurality of black matrices symmetrically cover the plurality of opaque regions and the plurality of dark strip regions.

19. The display panel as claimed in claim 18, wherein a screw pitch of the plurality of liquid crystal molecules ranges from two to seven times of a thickness of a cell gap.

20. The display panel as claimed in claim 18, wherein a first alignment layer is disposed on the array substrate, a second alignment layer is disposed on the color film substrate, and the first alignment layer and the second alignment layer are disposed correspondingly.

* * * * *